(12) United States Patent
Schalldach et al.

(10) Patent No.: US 12,495,027 B2
(45) Date of Patent: Dec. 9, 2025

(54) SECURE ONLINE AUTHENTICATION METHOD USING MOBILE ID DOCUMENT

(71) Applicant: THALES DIS FRANCE SAS, Meudon (FR)

(72) Inventors: Thomas Schalldach, Bustehrad (CZ); Gérald Maunier, Sanary-sur-Mer (FR)

(73) Assignee: THALES DIS FRANCE SAS, Meudon (FR)

( * ) Notice: Subject to any disclaimer, the term of this patent is extended or adjusted under 35 U.S.C. 154(b) by 167 days.

(21) Appl. No.: 18/548,499

(22) PCT Filed: Mar. 1, 2022

(86) PCT No.: PCT/EP2022/055152
§ 371 (c)(1),
(2) Date: Sep. 1, 2023

(87) PCT Pub. No.: WO2022/184714
PCT Pub. Date: Sep. 9, 2022

(65) Prior Publication Data
US 2024/0137354 A1 Apr. 25, 2024
US 2024/0236067 A9 Jul. 11, 2024

(30) Foreign Application Priority Data

Mar. 3, 2021 (EP) .................................. 21305255

(51) Int. Cl.
*H04L 9/40* (2022.01)
(52) U.S. Cl.
CPC .......... *H04L 63/08* (2013.01); *H04L 63/0853* (2013.01)

(58) Field of Classification Search
CPC . H04L 63/08; H04L 63/0853; H04L 63/0823; G06F 2221/2115; G06F 21/33; G06F 21/35
See application file for complete search history.

(56) References Cited

U.S. PATENT DOCUMENTS 7,720,221 B2 * 5/2010 Brown ................... H04L 9/3231
726/19
8,058,972 B2 * 11/2011 Mohanty ................. G07C 9/257
340/5.83

(Continued)

FOREIGN PATENT DOCUMENTS

WO 2016128569 A1 8/2016

OTHER PUBLICATIONS

International Search Report (PCT/ISA/210) and Written Opinion (PCT/ISA/237) mailed on Jul. 4, 2022, by the European Patent Office as the International Searching Authority for current International Application No. PCT/EP2022/055152—[12 pages].

*Primary Examiner* — Chau Le

(57) ABSTRACT

Provided is a secure online authentication method of a user by a relying party using a mobile ID document uses a secret to consent to a retrieval of a dedicated data field, wherein an access token is generated, including a proof, which is used by the relying party to transmit an access request to the mobile document issuer, trading the token for an authentication document comprising the personal data related to the dedicated data field by the document issuer to the relying party, wherein the proof verification material is extracted from the authentication document and checked to access said personal data and accepting the online authentication of the user. Other embodiments disclosed.

10 Claims, 6 Drawing Sheets

(56) References Cited

U.S. PATENT DOCUMENTS

| | | | | |
|---|---|---|---|---|
| 12,273,436 | B2* | 4/2025 | Gouget | G06F 21/602 |
| 2010/0052852 | A1* | 3/2010 | Mohanty | B42D 25/333 |
| | | | | 380/243 |
| 2016/0164680 | A1* | 6/2016 | Liao | H04L 9/3213 |
| | | | | 713/155 |
| 2019/0334884 | A1* | 10/2019 | Ross | G06F 21/41 |
| 2021/0194703 | A1* | 6/2021 | Queralt | H04L 63/0815 |

* cited by examiner

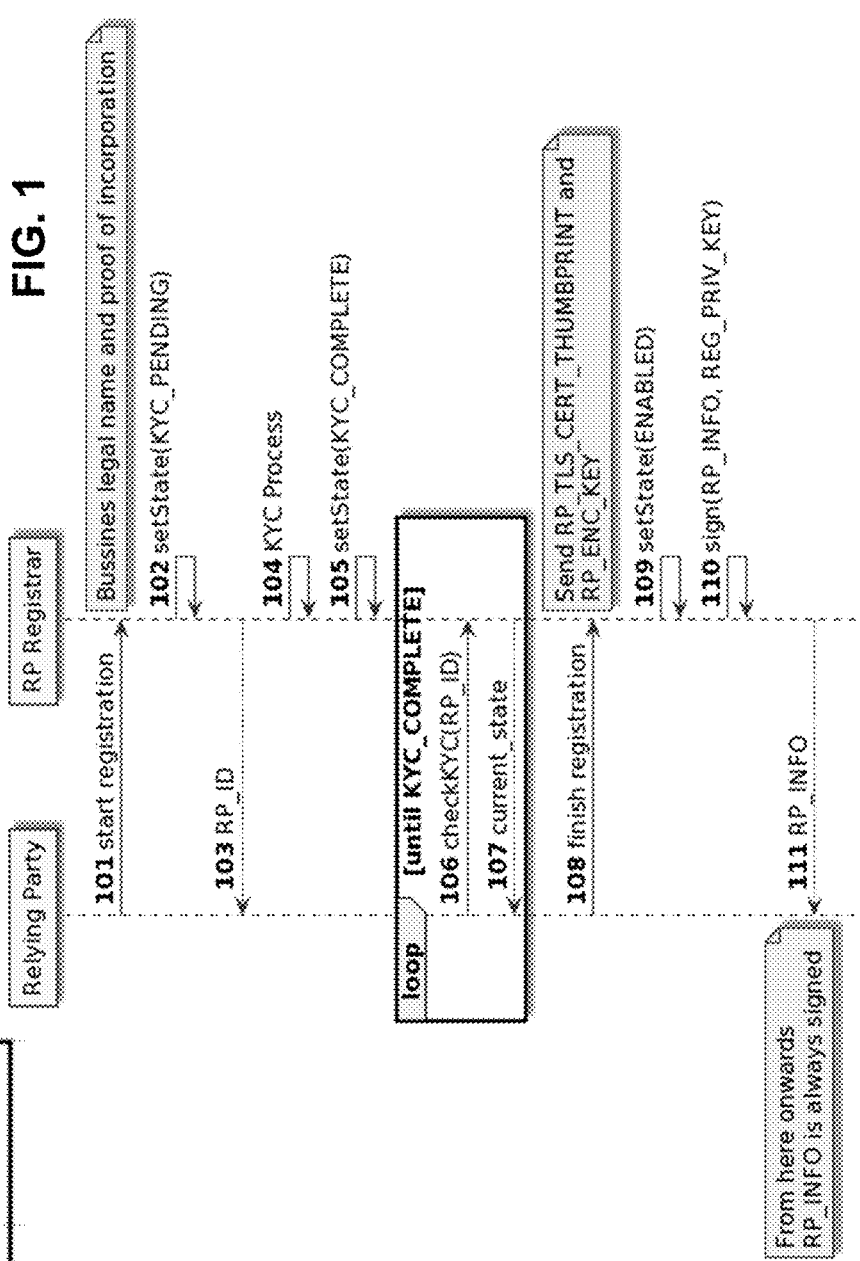

SECURE ONLINE AUTHENTICATION METHOD USING MOBILE ID DOCUMENT

FIELD

The present invention relates to a secure online authentication method using mobile ID document.

BACKGROUND

Mobile ID documents and wallets are designed primarily as convenient and secure physical documents alternatives, mainly bringing convenience to citizens and instant re-issuance service to governments. Secure design and relevant standards are setting up a trusted and interoperable domain for historical face-to-face ID verification use cases.

But at the eve of distancing and preference for online interactions, extending these mobile ID documents to online interactions is a real opportunity to enhance trust and privacy control in this untrusted and risky environment.

Ecosystem for face to face usage will take off slowly, first with law enforcement and then private sector, but there is an even larger market for online use by any Relying Party (RP).

ISO 18013-5 defines and enables a personal identification, especially an ISO-compliant driving license which is used within a mobile driving license (mDL) application. A Citizen (called Holder) owns a digital ID document in his mobile wallet, issued by an issuing entity (called Issuer) trusted by the Relying Party (called verifier). This digital document contains civil ID attributes like family name, first name, place of birth, date of birth, address etc. It may also contain entitlement attributes like right to drive a certain class of car, trucks, or boats. Documents also has a validity date attribute. Such a mobile ID document is defined by ISO 18013-5 and possesses appropriate technical attributes to prove it is genuine (not cloned or tampered) by using some signature & active authentication keys.

ISO 18013-5 also provides means for holder to deliver "online retrieval tokens" to local ID verifiers via proximity networking, as they may contact the document Issuer back-end to collect these user attributes directly from the issuer, probably 'more up to date'.

User authentication (ensuring holder is the legitimate owner of the provided document) is achieved 'manually' by human verifier, based on visual comparison of user face against portrait possibly included in the provided document, after verifier first ensured it is a valid document (signed by a trusted issuer), and that holder proved possession of the associated active authentication key (non-cloned document).

User is also in control of his privacy as RP explicitly requests ID attributes he needs to have, and user will provide express consent to share these attributes, and nothing else.

SUMMARY

It is noted that in ISO 18013-5 standard, some trust aspects are expected to come from the face-to-face context. In other words, the human verifier must check the portrait against the holder's face 'manually'. User also gets confidence on verifier's identity/role and legitimacy of his claims from the surroundings (e.g. police force car & suit, rental car shop, bank desk, . . . )

It an object of the present invention to replace the manual face matching when unattended. There are face recognition techniques being able to perform such face matching of an image with an image of an official document. It is a further object to address PCs with no cameras or low cost devices as e.g. kiosks and telling machines, i.e. where the camera is not performant enough to provide a face recognition match and or where the processing power of the electronic processor is not capable of doing so.

A further object comprises mitigating user fear of being matched by a machine.

If an electronic document is used, e.g. stored on a smart phone, it is possible that several persons, e.g. family members, can be enrolled to a phone, and it is a further object to identify legitimate document owner within this group of enrolled people.

Based on the above requirements, a sample target use case for this invention which is not possible with the prior art develops as follows:

User (Holder) is booking a car with online RP service for the first time, and needs to go through enrollment process. By law, online RP must verify driver age, his entitlement to drive and be able to redirect possible fines to driver's address in case of bad behavior on the road. On the other side, the holder wants to control what ID attributes are shared and securely transmit them in a convenient way, while being sure RP is a 'trusted RP', in view of the fact that his official ID attributes comprises further information which are of no relevance in the present case as e.g. height of the user. Finally, RP also wants to keep cost of ID verification low, enhance user adaption and simplify processes to deliver instantaneous service.

As it is clear from above, the solution of the process comprises on one side the method of authenticating the user. Such authentication is based on an initial enrollment protocol. The present disclosure provides for such a preferred enrollment protocol, but which is independent from the method of authenticating the user, in other words, the advantages of the above target use case can also be achieved with a different enrollment procedure but the enrollment provides further advantages to the present system.

The present invention first requires an initial online RP registration with an RP registrar, and the holder needs to have opted in to unattended online use. Furthermore the holder's wallet must be configured to trust the RP registrar. Holder may then engage with registered RPs in a few simple steps and RP can safely trust the resulting holder ID.

It is, as mentioned above, a further object to provide the holder with obvious trust evidences of the RP which, unlike in F2F usage, cannot be directly collected from the environment (policeman/car rental). This is connected to further advantages of the present approach, e.g. providing an online equivalent of «I see the bar tender in the bar», mitigation related to the usual online tricks of trying to steal user data (Phishing, Rogue AP, MiTm, . . . ) and finally, if nevertheless an ID[token] is stolen, to guarantee that a stolen ID[token] cannot be used.

In other words, the method for unattended online usage of mobile ID documents is an original method of engaging mobile ID documents with online ID verifiers (or kiosks/vending machines not equipped with NFC/BLE/Webcam), while preserving user control and protecting his privacy.

There is no easy way for a relying party to verify holder ID when not facing him in person, for enrollment, entitlement checks or age verification. For example an online car rental company or a kiosk may need to enroll a new customer with proper ID verification, but also ensure the entitlement to drive mentioned on the driving license is still valid (the customer did not lose his driving rights recently). This process is also usually not satisfactory for customers as they are required to perform complex and painful actions before they are granted access to the service.

This invention proposes a simple and secure method to extend initially anticipated mobile ID documents usage to online interactions, benefiting both user, online RP and possibly issuing government.

The invention is based on the insight that a secure online authentication method of a user by a relying party using a mobile ID document is possible; when the mobile document comprises at least one dedicated data type field connected to personal data of the user, cryptographic proof material and proof verification material being encrypted with a secret of the owner of the mobile document. In this context the user is the person performing the method using a mobile communication device he has access to (as e.g. via PIN or by biometrics) and it will be visible in the process as an advantage, that if the user is not the document owner, but a different person who has also access to the smartphone of the document owner which acts as wallet for the mobile electronic document, he will not be able to effect the online authentication successfully. In a successful case, it holds user=document owner.

The method comprises a number of steps starting with creating an user engagement structure comprising at least one dedicated data field by the relying party. This dedicated data field can be as an example the required age of the document owner which is to be known by the relying party, i.e. the vendor or business partner to enter in an agreement. Then follows the step of transmitting said user engagement structure by the relying party to the mobile communication device of the user, who is consenting to retrieval of the at least one dedicated data field by entering the secret by the user in his mobile communication device. Here, it becomes clear that if user < > document owner, he is not abler to provide the secret which is referred in this description also as secret passphrase.

Then an access token is created in the mobile communication device, proof material in the mobile communication device is decrypted using the secret, and a proof using proof material is generated in the mobile communication device, and all that is used for generating an access engagement structure comprising the access token and the proof inside the mobile communication device, which is then transmitted to the relying party. The transmittal inherently comprises acceptance of retrieval of the at least one dedicated data field through the relying party, since the passphrase is entered beforehand and is part of the creation of said access engagement structure.

The relying part backend is then transmitting an access request to the mobile document issuer based on the access engagement structure, where the token for an authentication document comprising the at least one personal data related to the at least one dedicated data type field by the document issuer is traded to the relying party.

Then either one or both of the document issuer and the relying party can and shall extract the proof verification material from the authentication document and check the proof, which enables extracting the at least one personal data related to the at least one dedicated data type field from the authentication document and finally allows the relying party to accept the online authentication of the user and thus the underlying business.

Preferably, transmitting said user engagement structure by the relying party to the mobile communication device of the user comprises transmittal of one or both of a scannable code, especially a QR code, or a deep link URL. If the user is using an external machine, as a kiosk or desktop computer, the display will provide the scannable code which can be taken by the camera of the mobile communication device being the wallet for the user. If on the other side the user uses his mobile communication device, the display can provide a clickable "click here" information for accessing a deep link.

In a preferred embodiment, consenting to retrieval by entering the secret by the user in his mobile communication device can comprise a manually entered secret or a specific document owner related biometrics check.

Proof material used in the method is preferably a private key and the proof verification material is a public key from a asymmetric cryptography system.

The secure online authentication method allows the relying party to authenticate the user; but on the other side, the user, if not in presence of a proof of the relying party, it is preferred to add verification steps allowing a secure online authentication process of a relying party for the user. Then the relying party is registered in a relying party registry with at least the following data fields a relying party ID, the name of the relying party, as well as an encryption key and encryption type and a relying party endpoint. Then the above secure online authentication method further comprises within the step of creating the user engagement structure by the relying party, including the relying party ID of the relying party and the endpoint of the relying party backend, before the step of generating the access engagement structure, extracting said data fields from the user engagement structure and accessing the relying party registry by relying party ID, to obtain a relying party endpoint and an encryption key and encryption type of the relying party, after the step of generating the access engagement structure, encrypting the access engagement structure with the type and key of the relying party, accessing the relying party backend's endpoint, and verify the endpoint, and after transmitting the access engagement structure to the relying party, decrypting the access engagement structure with the relying party key and type.

The further object mentioned above, i.e. mitigating user fear of being matched by a machine can be solved by a secure online authentication method of a relying party for a user using a mobile communication device in a business engagement method comprising the steps of creating an user engagement structure comprising at least one dedicated data field by the relying party, transmitting said user engagement structure by the relying party to the mobile communication device of the user, generating a business engagement structure inside the mobile communication device, transmitting the business engagement structure to the relying party, extracting the at least one personal data related to the at least one dedicated data field from the business engagement structure, accepting (37, 38) the online authentication of the user, wherein the relying party is registered in a relying party registry with at least the following data fields a relying party ID, the name of the relying party, as well as an encryption key and encryption type and a relying party endpoint, wherein the method comprises the further characterizing features of, within the step of creating an user engagement structure by the relying party, including the relying party ID of the relying party and the endpoint of the relying party backend, before the step of generating the business engagement structure, extracting said data fields from the user engagement structure and accessing the relying party registry by relying party ID, to obtain a relying party endpoint and an encryption key and encryption type of the relying party, after the step of generating the business engagement structure, encrypting the business engagement structure with the type and key of the relying party, accessing the relying party backend's endpoint, and verify the endpoint, after transmitting the business engagement structure to the relying party, decrypting the business engagement structure with the relying party key and type.

In either of the above mentioned secure online authentication method, in a preferred embodiment the relying party endpoint information comprises a TLS certificate thumbprint, and within the step of accessing the relying party backend's endpoint comprises establishing a TLS connection to the endpoint and verify the TLS certificate thumbprint.

Additionally, after accessing the relying party registry, the relying party's clear name is displayed on the mobile device of the user.

Further embodiments of the invention are laid down in the dependent claims.

Mobile ID Documents have all the advantages required as they are issued by trusted parties, stored securely, convenient to use and standardized. But their usage has been defined only for face to face verifications, with the verifier holding a verifying device in close proximity of the holder's device (BLE, Wifi, NFC). The invention goes beyond these limits and enables a wider range of usages. The present specification brings an innovative and secure solution to enable online & unattended usage of mobile ID documents. The depicted mechanisms provides trust to RPs while preserving the user control over his attributes & privacy.

In the above general explanation as within the specific description of embodiments, the following definitions are used.

Holder role: a citizen holding a digital wallet and at least one digital document (e.g. mDL).

Digital Wallet: a mobile application provisioned with digital documents in charge of online RP verification in RP registry/BC (Blockchain).

Registry/BC role: a directory of validated online RPs a holder may refer to authenticate RP and establish secure exchanges with RP.

Digital document: a physical document equivalent, issued by an issuer.

mDL: a special type of digital document instance, digital equivalent of a physical driver license.

Issuer role: A trusted entity vouching for holder attributes (e.g. state).

RP/verifier role: an entity willing to verify holder identity face-to-face thanks to a digital document.

Online RP/verifier role: an online relying party or unattended system, willing to consume digital documents, e.g. for secure/fast/convenient onboarding or entitlement verification (e.g. driving rights).

OR role: i.e. Online Retrieval role a specific mechanism where [online] verifier may exchange a holder-issued token against a digital identity document from the issuer.

OR token: a token delivered by the holder to the [online] RP as he may contact the OR endpoint and get access to holder's ID.

Registrar role: a trusted entity performing RP verification and provisioning RP information in RP registry.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows RP Registration steps within a secure online authentication using mobile ID Document;

FIG. 2 shows an example of an RP_REGISTRY;

DETAILED DESCRIPTION

Figure 3:
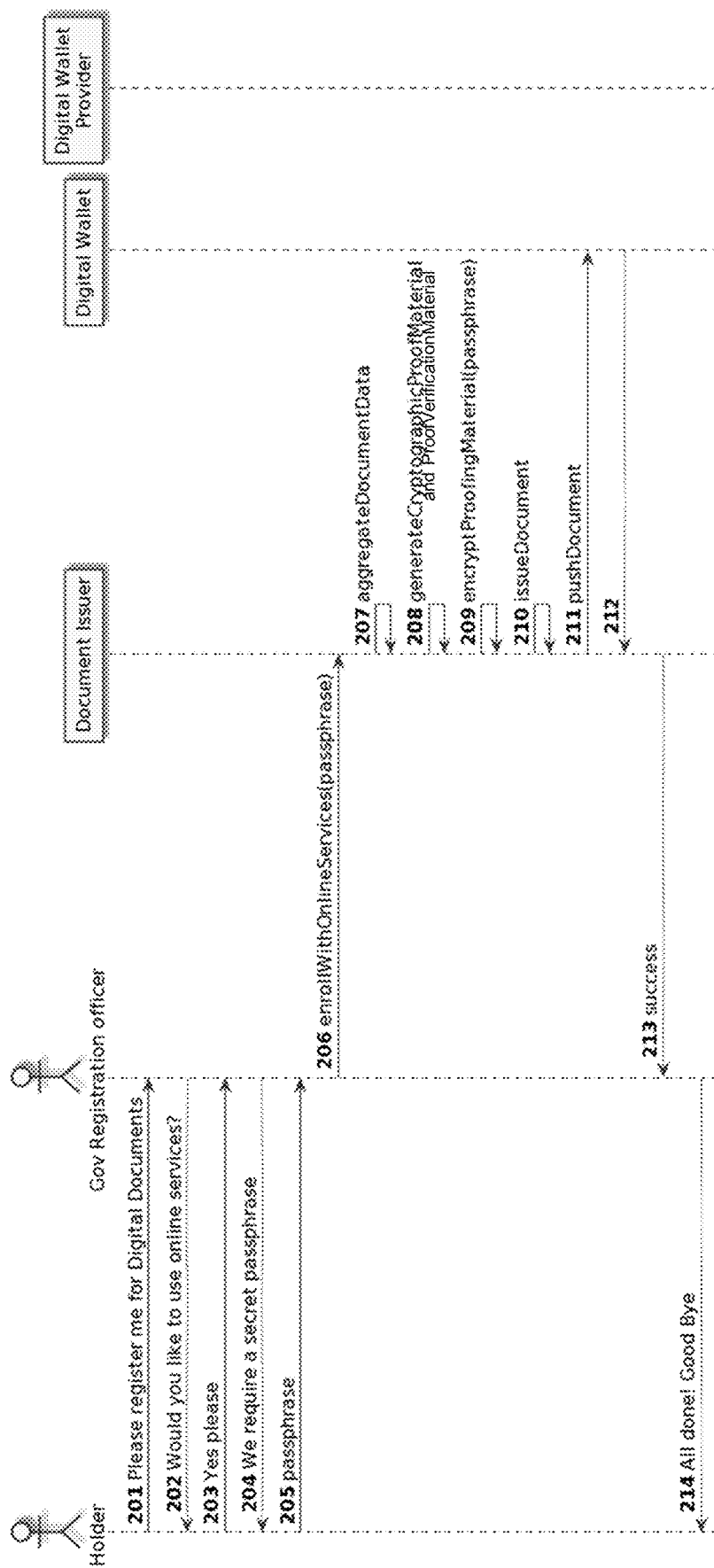
FIG. 3 shows User Registration steps within a secure online authentication using mobile ID Document.

FIG. 1 shows RP Registration steps within a secure online authentication using mobile ID Document between a relying party (RP), a RP registrar and independent from the registrar an RP registry and/or RP blockchain.

The relying party starts registration 101 transmitting business legal name and proof of incorporation to the RP registrar. The RP registrar sets a state 102 for the registration as KYC_PENDING for know your customer registration is pending and sends a relying party identifier RP_ID 103 to the RP.

The KYC process 104 is running within the RP registrar until the RP registrar is capable to set the state 105 to the completion of the KWY step which happens when the RP is transmitting RP_ID information 106 to the RP registrar who checks it and sends back the current state 107.

In order to finish registration 108, the RP sends a user verifiable RP endpoint proof like a TLS_CERT_THUMBPRINT and RP_ENC_KEY to the RP registrar. The RP registrar is setting the state 109 of this relying party to enabled and publishes 110 the RP_INFO in the RP Registry, which is confirmed 110 by the registry which is then confirmed 112 to the RP.

FIG. 2 shows possible data included in the RP Registry as RP_ID. The data can be the RP_NAME, the RP_TLS_CERT_THUMBPRINT and the RP_ENC: KEY&TYPE.

FIG. 3 shows user registration steps within a secure online authentication using mobile ID Document.

The user as a person enters in contact with e.g. a governmental registration officer with the request 201 to register a digital document for him. The present use case starts from the assumption that the user responds 203 "yes" on the officer's question 202 if he would like to use online services. Then the user is required 204 to provide 205 a passphrase. Said passphrase is a cornerstone of the method of the present invention.

The governmental registration officer contacts the document issuer electronically and transmits 206 the passphrase as part of the enrolment proceedings on behalf of the user.

The document issuer internally aggregates the document data 207, creates cryptographic proof material 208 together with proof verification material and encrypts 209 cryptographic proof material with said passphrase of the user. He then issues 210 the document and pushes 211 the document into the digital wallet of the holder.

The acknowledgement is sent 212 back to the document issuer, then sent it back 213 to the registration officer, which is transferred 214 as last step to the holder.

The issued document contains the Proof Material encrypted with the user passphrase as well as the Proof Verification Material signed by the issuer. The entry of the Passphrase will be required for the wallet to decrypt this Proof Material and use it to generate Authentication Proof. The RP will verify Authentication Proof thanks to associated Proof Verification Material.

Figure 4:
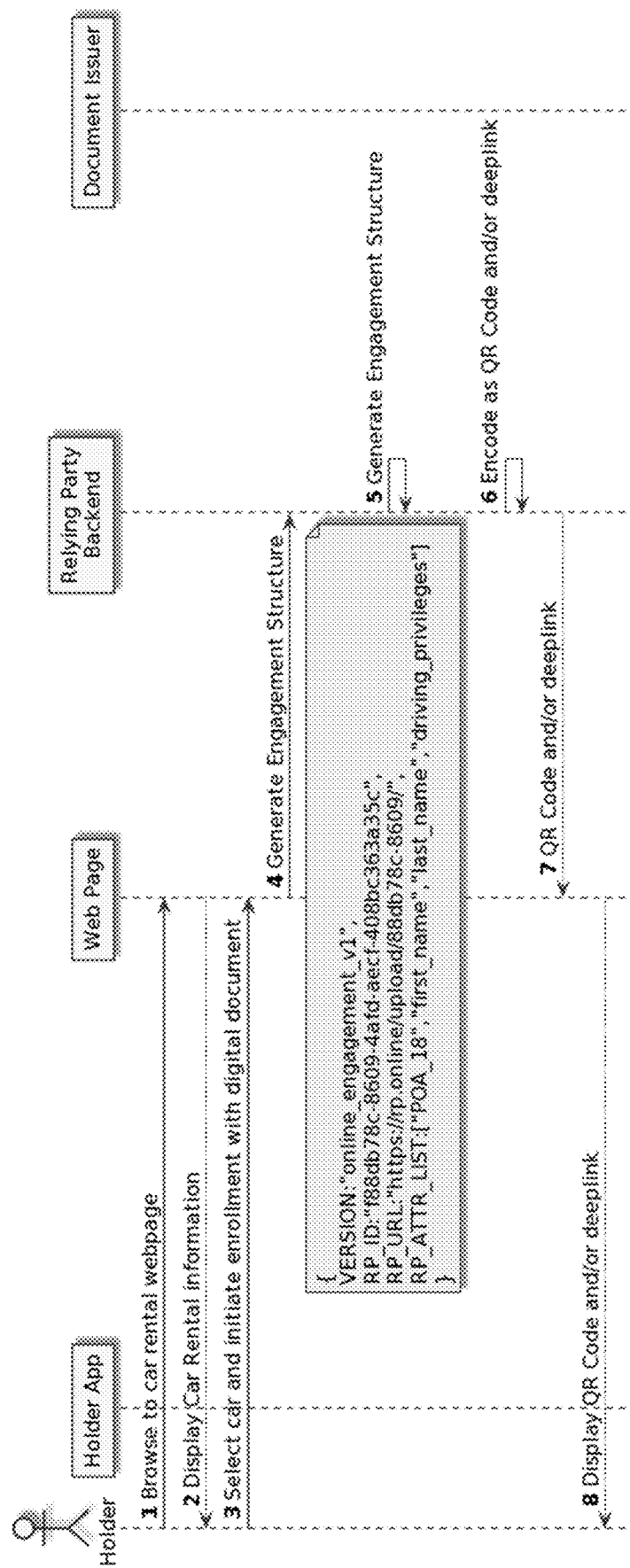
FIG. 4 shows initial engagement steps of the online usage of a method for unattended online usage of mobile ID documents.

FIG. 4 shows engagement steps of the online usage of a method for unattended online usage of mobile ID documents.

The holder having access to his holder app is visiting 1 a web page of a service or goods provider. Here, since initial reference is made to an mDL and a use case where specific elements have to be provided and authenticated, it is assumed that the provider is a car rental service.

The web site of the car rental service answers the request displaying 2 service information as car rental information (model, start rental time, included or optional services and costs etc.). The holder makes his choice 3 on the web site and transmits with his request specific information. The web page contacts 4 the relying party backend to generate engagement structure.

The relying backend automatically generates 5 the engagement structure, It encodes 6 this as a digital information as e.g. a QR code or a clickable deep link for a mobile only experience. The digital code is transferred 7 back to the web page and displayed 8 as e.g. QR code or URL to the holder.

Figure 5:
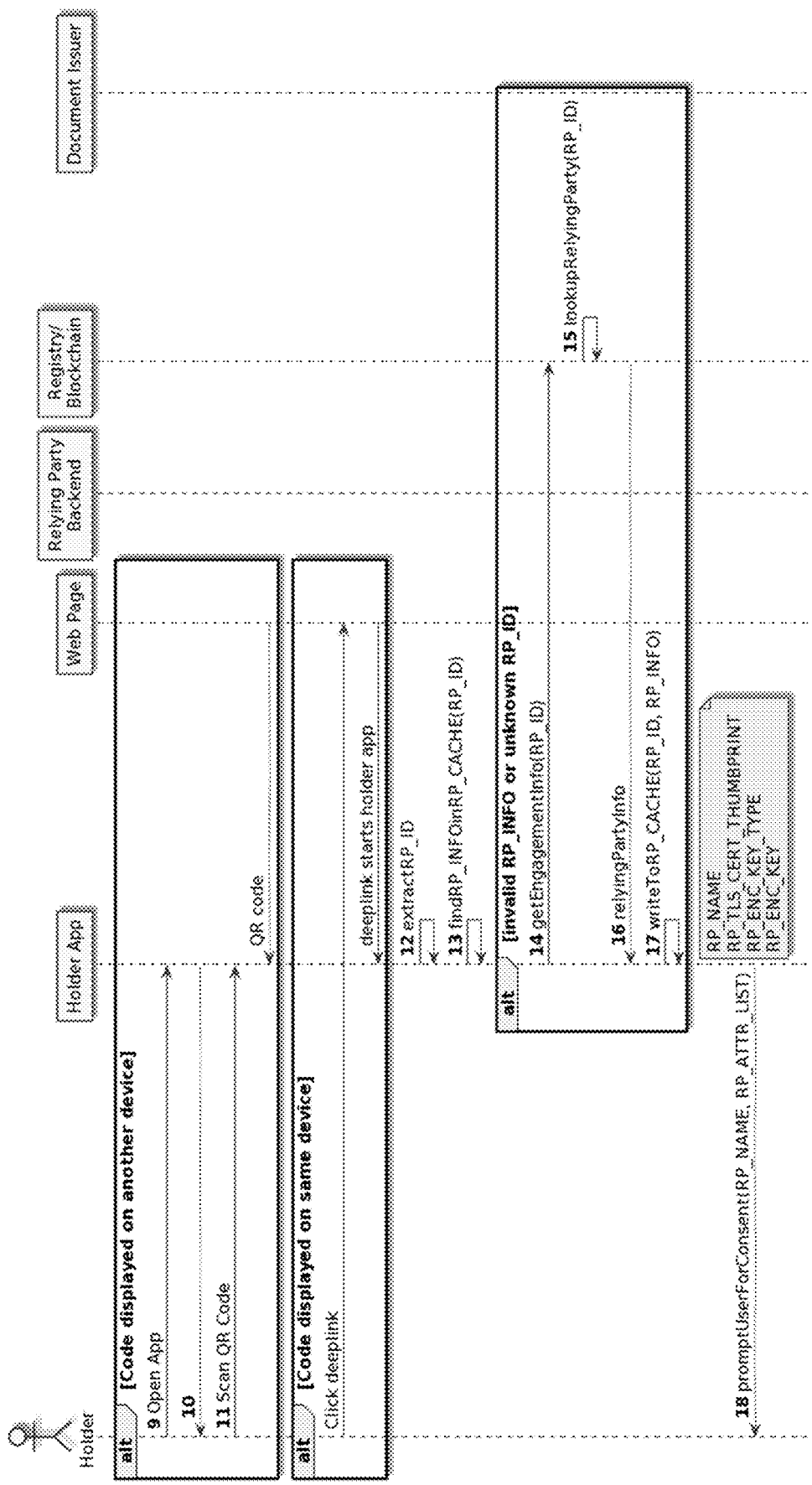
FIG. 5 shows further RP trust and look up steps of the online usage of a method for unattended online usage of mobile ID documents.

FIG. 5 shows further RP trust and look up steps of the online usage of a method for unattended online usage of mobile ID documents.

After the initial steps as explained in connection with FIG. 4 the holder opens 9 his app, which when opened 10, is used to scan 11 said QR code. The holder app extracts 12 the RP_ID and performs 13 a lookup in the RP_CACHE. If he does not find it, he asks 14 for the engagement info from the registry, which looks up 15 the relying party's RP_ID and sends back 16 the relying party information to the holder app which writes 17 the RP_INFO to be able to find directly the info when performing next time the lookup step 13 with this (mobile) electronic device.

The holder app displays 18 RP_NAME as well as the RP_ATTR_LIST and prompts the user/holder for consent. The RP_ATTR_LIST comprises the RP clear name, the RP TLS CERT THUMBPRINT as well as the RP_ENC_KEY and RP_ENC_KEY_TYPE.

Figure 6:
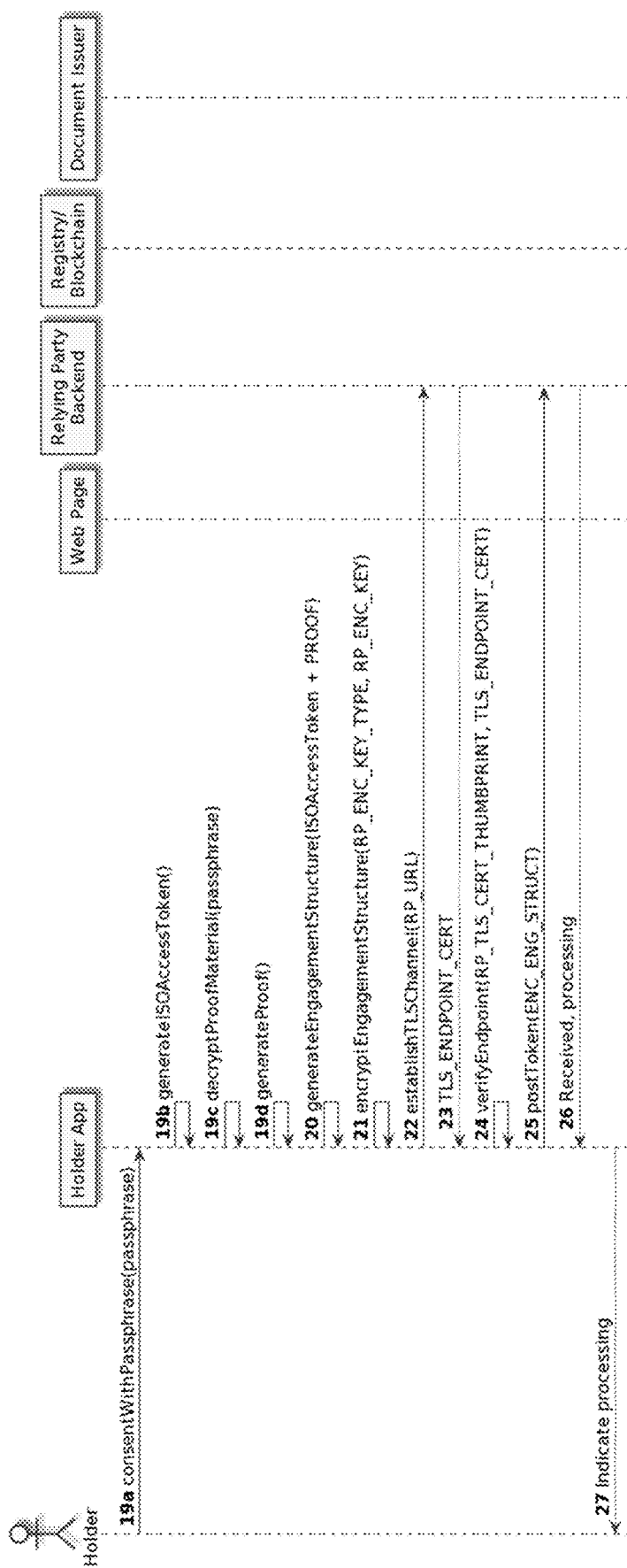
FIG. 6 shows further user consent and ISO token transfer steps of the online usage of a method for unattended online usage of mobile ID documents.

FIG. 6 shows further user consent and ISO token transfer steps of the online usage of a method for unattended online usage of mobile ID documents.

The user signalizes consent 19a with entering the passphrase in the holder app, triggering the generation 19b of the ISO Access token, decrypt 19c the proof material with the passphrase, generate 19d a proof and uses it to generate 20 an engagement data structure comprising the ISO Access token and the proof. Said engagement data structure is directly encrypted 21 with the RP_ENC_KEY based on the RP_ENC_KEY_TYPE.

The holder app then establishes 22 an TLS channel with the RP_URL known from the QR code which is acknowledged 23 as TLS_ENDPOINT_CERT from the relying party backend. The holder app verifies 24 the TLS_ENDPOINT_CERT with the RP_TLS_CERT_THUMBPRINT and sends 25, if the verification is positive, the encrypted engagement structure ENC_ENG_STRUCT, encompassing the ISO Access token and the PROOF. The relying party backend sends back 26 an received and processed information which is indicating 27 the processing step.

Figure 7:
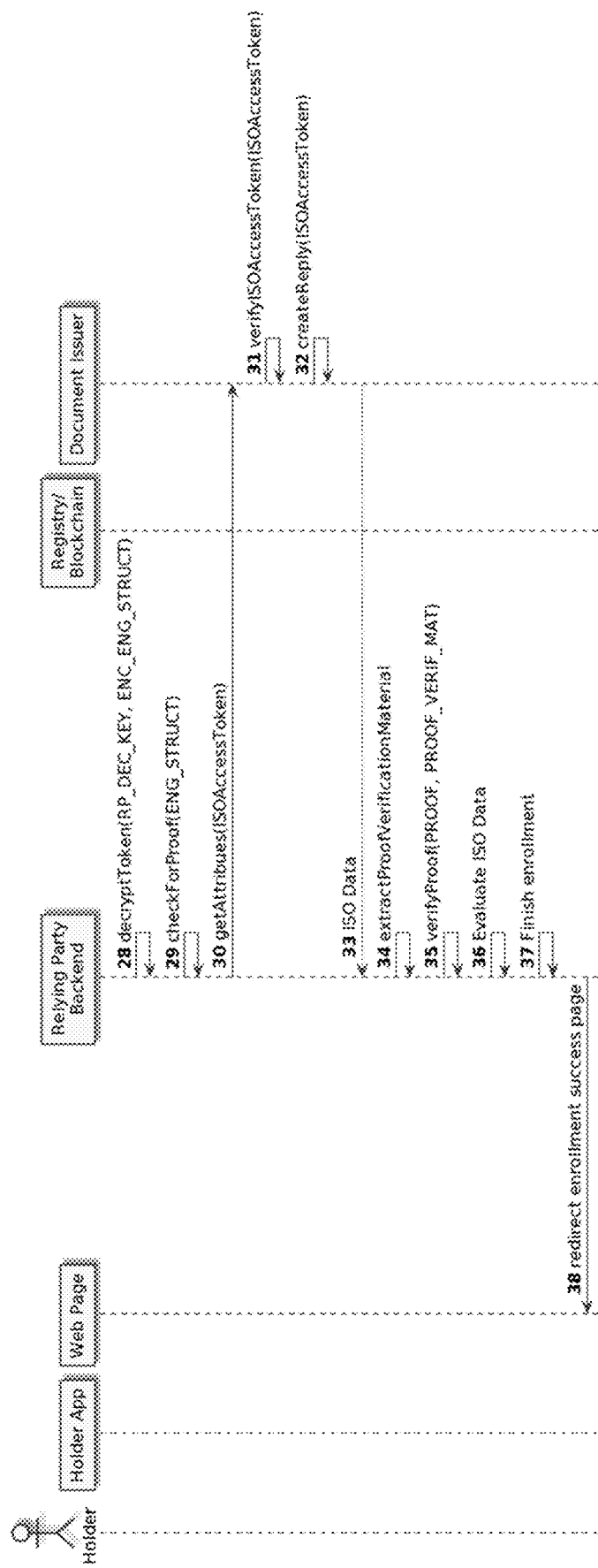
FIG. 7 shows further core data exchange steps of the online usage of a method for unattended online usage of mobile ID documents.

FIG. 7 shows further core data exchange steps of the online usage of a method for unattended online usage of mobile ID documents. These steps are executed by the relying party backend while the user/holder is awaiting the result. Initially, the relying party backend is decrypting 28 the encrypted engagement structure using the RP_DEC_KEY which is usually the public key of the private-public key pair. Then the ISO Access Token is used 30 with the document issuer to obtain the ISO Data. Therefore, the document issuer verifies 31 the ISO Access token and creates 32, if correct, a reply on the ISO Access token.

This reply is sent back 33 as ISO Data containing the requested attributes as well as, optionally, proof verification material, comprising the PUB KEY. In this case, the extraction 34 of proof verification material as well as the verification 35 of proof is performed within the relying backend. It is also possible that this proof verification is performed at the document issuer. Then the ISO Data is provided together with the proof verification result.

This, however, does not hinder the relying backend to also effect the verification, so verification happens at both instances.

The relying party backend evaluates 36 the ISO data necessary for concluding in the commercial exchange, here finishing 37 the enrolment for the car rental and redirecting 38 the enrolment success page on the web page.

The above procedure is now described in a different wording using the identical drawings.

Within the initial opt in to unattended online use of mobile document as shown in FIG. 3, holder registers for digital wallet and mobile document during issuers enrollment procedure. During the enrollment, the holder consents 3 to online usage service and is asked 4 to create a passphrase 5. The passphrase is only known to the documents specific holder being a person and not stored anywhere online. During issuance an OTP seed is encrypted with the passphrase and stored inside the document.

The Initial Online RP registration is explained in connection with FIGS. 1 and 2. Online RP (ONLINE_RP) starts 101 registration with an online RP directory (RP_DIRECTORY), operated by a trusted online RP registrar (RP_REGISTRAR) using a verification process similar to a CA: ONLINE_RP provides verifiable information like business incorporation name (RP_NAME), TLS certificate attached to his online token collection endpoint (TLS_CERT_THUMBPRINT), and a key for tokens encryption (RP_ENC_KEY). After proper data verifications, RP_REGISTRAR delivers 103 a unique RP_ID (uuid) to ONLINE_RP. Note RP_REGISTRAR role could be handled by a document issuer, a verifier manufacturer or a fully independent entity.

The Initial trust configuration on holder's wallet app (HOLDER_APP) is shown in connection with FIG. 4. During manufacturing or later via a controlled process, RP_REGISTRAR is added to the HOLDER_APP trust store, as RP_REGISTRAR may be trusted by holder's wallet to deliver trusted data about registered online RPs. This may for example be achieved by storing RP_REGISTRAR's certificate (REGISTRAR_TLS_CERTIFICATE) and internet address (REGISTRAR_ENDPOINT). It is noted that HOLDER_APP may be provisioned with multiple trusted RP_REGISTRARS.

A typical use of the solution is explained in connection with FIG. 4pp. Holder engages with an ONLINE_RP service, e.g. from his laptop or kiosk, and reaches a step (e.g. enrollment or validation of a transaction) where ONLINE_RP requires proof of holder identity and up to date entitlements which will be provided e.g. through a web page by generating 4 an engagement structure comprising these items. User may be offered several techniques to provide such proof, and selects to most convenient: 'use his mobile wallet'

ONLINE_RP will then generate 6, transmit 7 and display 8 an online sharing structure as a QR code format (RP_QR_CODE) on user's web page or kiosk screen. This RP_QR_CODE contains enough information for the user to verify ONLINE_RP identity and engage in attributes sharing safely. But as QR codes payload is limited to ensure it is easily captured by holder's device camera, RP_QR_CODE will and can usually contain a specific structure with following limited set of attributes:

Protocol identifier & version
RP_ID
RP_ATTR_LIST (List of required attributes as defined in ISO 18013-5)
RP_TLS_ENDPOINT (short URL holder wallet must connect to and transmit encrypted OR token, possibly containing RP transaction ID).

Beside a QR code any easily usable code by a mobile wallet, usually a smart phone with a camera can be used. It can also be a deep link which is e.g. transmitted to the holder app via a wireless means as Bluetooth or other NFC technologies. QR code on the other side can be any digital code also comprising colours, having a different shape and other features.

Holder scans 11 the QR code with his HOLDER_APP containing at least one relevant digital ID document. RP_QR_CODE content will be parsed and checked by the HOLDER_APP. Granted protocol identifier and version matches the expected format, HOLDER_APP then contacts one of his trusted RP_REGISTRAR and submits 14 RP_ID. RP_REGISTRAR will return a structure containing verified online RP information (REGISTRAR_RP_INFO) and HOLDER_APP may use to ensure online RP is genuine. Details of REGISTRAR_RP_INFO can be as follow:

RP_NAME (meaningful company name user may check against the current interacted RP)
RP_TLS_CERT_THUMBPRINT (registered certificated for OR token submission TLS endpoint)
RP_ENC_KEY_TYPE (Applicative encryption key type RSA/ECC/AES256)
RP_ENC_KEY (key for applicative encryption)

It is noted that RP_REGISTRAR may contact another RP_REGISTRAR to get and forward the REGISTRAR_RP_INFO.

HOLDER_APP displays the returned RP_NAME to holder. Holder consents to proceed with the displayed online RP_NAME id sharing. HOLDER_APP extracts the list of requested attributes RP_ATTR_LIST and prompts 18 holder to get his consent to share. Holder is prompted 19a for his online passphrase to consent to share these attributes with ONLINE_RP. HOLDER_APP generates 19b an ISO 18013-5 compliant OR token (OR_TOKEN). HOLDER_APP decrypts 25 OTP seed and generates OTP.

HOLDER_APP encrypts the OR_TOKEN and OTP as ENC_OR_TOKEN using the received RP_ENC_KEY and RP_ENC_KEY_TYPE.

HOLDER_APP connects 22 to RP_TLS_ENDPOINT and ensures TLS certificate thumbprint matches the received RP_TLS_CERT_THUMBPRINT in addition to usual certificate chain verifications. HOLDER_APP then transmits the ENC_OR_TOKEN to ONLINE_RP. Finally, ONLINE_RP decrypts 28 the ENC_OR_TOKEN with its decryption key (RP_DEC_KEY) matching RP_ENC_KEY and ONLINE_RP verifies existence of OTP. ONLINE_RP uses decrypted OR_TOKEN and OTP together to request user attributes from issuer OR endpoint.

OR endpoint verifies 35 OTP associated to identified HOLDER_APP and document.

If OTP was valid, OR prepares reply with attributes as e.g. defined in ISO 18013-5. The advantages are inter alia that ONLINE_RP can be sure holder was authenticated and actually holding the provided document and HOLDER did not communicate his portrait to ONLINE_RP or the other way round. The ONLINE_RP does not necessarily have a camera or computation power to verify such a portrait image. Therefore, an easy and fast solution for citizens to leverage their mobile ID documents everywhere (face 2 face, kiosks, online). An enhanced confidence & trust is provided for RPs (better compliance, cheaper enrollment/compliance process, better enrollment & service usage & success rate, lower risks of frauds on documents). More usage contexts and unified user experience across services and it is a privacy preserving process for citizens.

LIST OF REFERENCE SIGNS 1 browse to the providers equipment
2 display car rental information, goods or services information
3 select car and enrolment data with digital document
4 creation of engagement structure data fields
5 creation of engagement structure filled with data
6 encode as QR-code or other direct wallet usable information, visible or to be transmitted by near field technology
7 transmit QR code to web page
8 display QR code on web page
9 open app
10 acknowledge open up step
11 scan QR code
12 extract RP_ID
13 find RP_INFO for RP IN
14 requesting Rp_ID info from registry
15 Lookup relaying to relying party
16 rely party information
17 write (RP_ID, RP_INFO) to RP_CACHE
18 retransmit RP retrieved data for consent
19a transmits consent phrase
19b generate ISO Access token
19c decrypt material with passphrase
19d generate proof
20 generate engagement structure with ISO token and PROOF
21 encrypt engagement structure
22 establish TLS channel
23 receive TLS_ENDPOINT_CERT
24 verify endpoint
25 post token ENC_ENG_STRUCT
26 transmit received information
27 indicate processing to user
28 decrypt token
29 check for proof
30 get attributes from ISO token
31 verify data from ISO token
32 create reply of verification
33 ISO data transferred
34 extract proof verification 35 verify proof
36 evaluate ISO data
37 finish enrolment
38 redirect and inform holder of success
101 start registration
102 set state
103 transmit RP_ID
104 KYC process
105 set state of a completed KYC process
106 check RP_ID
107 answer with current state
108 finish registration with TLS_CERT_THUMBPRINT and RP_ENC_KEY
109 set state as enabled
110 publish RP_INFO
111 confirmation to RP registrar
112 showing the mobile registration is finished
201 register digital document
202 ask whether to use online services
203 answer yes on the answer about use of online services
204 a passphrase is requested
205 the passphrase is transmitted
206 enrolment with Online services using this passphrase
207 aggregate document data
208 generate cryptographic proof material
209 encrypt proofing material with the passphrase
210 issue the document
211 push document
212 reporting success
213 reporting success
214 end of enrolment process

The invention claimed is:

1. A secure online authentication method of a user by a relying party using a mobile ID document; wherein the mobile document comprises at least one dedicated data field connected to personal data of the user, cryptographic proof verification material and proof material being encrypted with a secret of the user of the mobile document, wherein the user is using a mobile communication device, the method comprising the steps of
   creating an user engagement structure comprising at least one dedicated data type field by the relying party;
   transmitting said user engagement structure by the relying party to the mobile communication device of the user;
   consenting to retrieval of the at least one dedicated data field by entering the secret by the user in his mobile communication device;
   generating access token in the mobile communication device;
   decrypting proof material in the mobile communication device using the secret;
   generating a proof in the mobile communication device using proof material;
   generating an access engagement structure comprising the access token and the proof inside the mobile communication device;
   transmitting the access engagement structure to the relying party;
   transmitting an access request to the mobile document issuer by the relying party based on the access engagement structure;
   trading the token for an authentication document comprising the at least one personal data related to the at least one dedicated data field by the document issuer to the relying party;
   one or both of the document issuer and the relying party, extracting the proof verification material from the authentication document and checking the proof;
   extracting the at least one personal data related to the at least one dedicated data field from the authentication document; and
   accepting the online authentication of the user.

2. The secure online authentication method according to claim 1, wherein transmitting said user engagement structure by the relying party to the mobile communication device of the user comprises transmittal of one or both of a scannable code, a QR code, or a deep link URL.

3. The secure online authentication method according to claim 1, wherein consenting to retrieval by entering the secret by the user in his mobile communication device can comprise a manually entered secret or a specific document owner related biometrics check.

4. The secure online authentication method according to claim 1, wherein, within the step of generating a proof in the mobile communication device using proof material, the proof material is a private key and the proof verification material is a public key from a asymmetric cryptography system.

5. The secure online authentication method according to claim 1, further comprising a secure online authentication process of a relying party for the user, wherein the relying party is registered in a relying party registry with at least the following data fields a relying party ID, the name of the relying party, as well as an encryption key and encryption type and a relying party endpoint wherein the secure online authentication method further comprises:
   within the step of creating the user engagement structure by the relying party, including the relying party ID of the relying party and the endpoint of the relying party backend,
   before the step of generating the access engagement structure, extracting said data fields from the user engagement structure and accessing the relying party registry by relying party ID, to obtain a relying party endpoint verification information and an encryption key and encryption type of the relying party,
   after the step of generating the access engagement structure, encrypting the access engagement structure with the type and key of the relying party, accessing the relying party backend's endpoint, and verify the endpoint using verification information,
   after transmitting the access engagement structure to the relying party, decrypting the access engagement structure with the relying party key and type.

6. The secure online authentication method according to claim 5, wherein the relying party endpoint verification information comprises a TLS certificate thumbprint, and wherein
   within the step of accessing the relying party backend's endpoint comprises establishing a TLS connection to the endpoint and verify the TLS certificate thumbprint.

7. The secure online authentication method according to claim 5, wherein, after accessing the relying party registry, the relying party's clear name is displayed on the mobile device of the user.

8. A secure online authentication method of a relying party for a user using a mobile communication device in a business engagement method comprising the steps of:
   creating an user engagement structure comprising at least one dedicated data field by the relying party;
   transmitting said user engagement structure by the relying party to the mobile communication device of the user;

generating a business engagement structure inside the mobile communication device;

transmitting the business engagement structure to the relying party;

extracting the at least one personal data related to the at least one dedicated data field from the business engagement structure;

accepting the online authentication of the user;

wherein the relying party is registered in a relying party registry with at least the following data fields:
- a relying party ID,
- the name of the relying party, as well as an encryption key and encryption type and
- a relying party endpoint verification information wherein the method comprises:
- within the step of creating an user engagement structure by the relying party, including the relying party ID of the relying party and the endpoint verification information of the relying party backend;
- before the step of generating the business engagement structure, extracting said data fields from the user engagement structure and accessing the relying party registry by relying party ID, to obtain a relying party endpoint verification information and an encryption key and encryption type of the relying party;
- after the step of generating the business engagement structure, encrypting the business engagement structure with the type and key of the relying party, accessing the relying party backend's endpoint, and verify the endpoint; and
- after transmitting the business engagement structure to the relying party, decrypting the business engagement structure with the relying party key and type.

9. The secure online authentication method according to claim 8, wherein the relying party endpoint verification information comprises a TLS certificate thumbprint, and wherein
- within the step of accessing the relying party backend's endpoint comprises establishing a TLS connection to the endpoint and verify the TLS certificate thumbprint.

10. The secure online authentication method according to claim 8, wherein, after accessing the relying party registry, the relying party's clear name is displayed on the mobile device of the user.

\* \* \* \* \*